April 28, 1970      S. RIZZOLO      3,509,512

SLIP RING ASSEMBLY

Filed Oct. 24, 1968      2 Sheets-Sheet 1

INVENTOR
SILVIO RIZZOLO

BY *John G. Kovalich*

AGENT

April 28, 1970 — S. RIZZOLO — 3,509,512
SLIP RING ASSEMBLY
Filed Oct. 24, 1968 — 2 Sheets-Sheet 2

INVENTOR
SILVIO RIZZOLO
BY John G. Kovalick
AGENT

United States Patent Office 3,509,512
Patented Apr. 28, 1970

3,509,512
SLIP RING ASSEMBLY
Silvio Rizzolo, Nutley, N.J., assignor to Engelhard
Minerals & Chemicals Corporation, Newark, N.J.,
a corporation of Delaware
Filed Oct. 24, 1968, Ser. No. 770,253
Int. Cl. H01r 39/08
U.S. Cl. 339—8                             5 Claims

ABSTRACT OF THE DISCLOSURE

A slip ring assembly comprising an elongated cylindrical core, an elongated cylindrical sleeve coaxially spaced from and encompassing the core, the sleeve being composed of a series of electrically conductive metal rings bonded to a series of in situ molded insulation rings, the metal rings and insulation rings axially alternating with each other and forming the sleeve, and a plurality of electrical conductor wires located longitudinally between the core and sleeve with each wire connected to a conductor ring and extending outwardly of an end of the core and sleeve assembly.

BACKGROUND OF THE INVENTION

Heretofore, slip ring assemblies, e.g. of the miniature type, were generally constructed either by placing conductive rings in a mold and then molding the insulation core, or by forming an insulated core with grooves and thereafter filling the grooves with conductive material by an electroplating process. Such known slip rings have the disadvantage either in that it is difficult to assure slip ring concentricity during the molding of the core, or the difficulty, especially with minature slip rings, of locating small holes in the grooves for communication with the wire conductors and the assurance of good electrical contact between the wires and the subsequently electroplated conductive material.

The present invention assures concentricity and constant spacing of the conductive rings during an insulation ring molding process and also assures good electrical contact between the conducting wires and the conductive rings.

SUMMARY OF THE INVENTION

In accordance with the invention there is provided a slip ring assembly comprising an elongated cylindrical core, an elongated cylindrical sleeve coaxially spaced from and encompassing the core, a plurality of parallel circumferentially spaced spacer rods positioned between the core and sleeve substantially co-extensively with the core and sleeve, the sleeve being composed of a series of electrically conductive metal rings bonded to a series of in situ molded insulation rings, the metal rings and insulation rings axially alternating with each other and forming the sleeve, and a plurality of electrical conductor wires located longitudinally between the core and sleeve with each wire connected to a conductor ring and extending outwardly of an end of the core and sleeve assembly.

DESCRIPTION OF THE PREFERRED EMBODIMENTS

Figure 1:
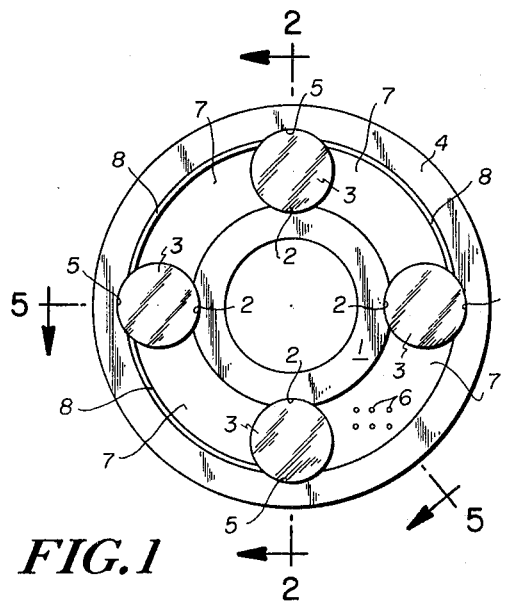
FIGURE 1 illustrates an elevational end view of a partially completed slip ring assembly.
Figure 2:
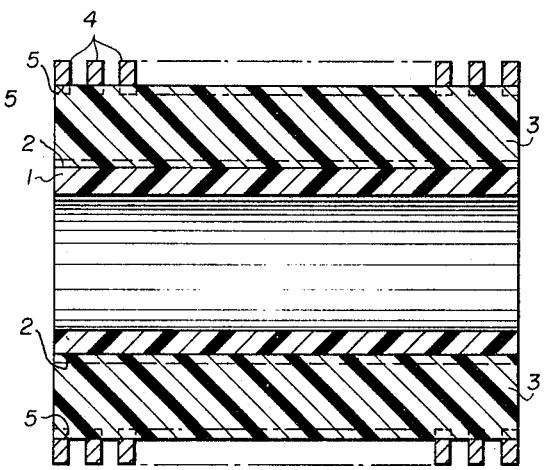
FIGURE 2 illustrates a cross-sectional view along lines 2—2 of FIGURE 1.
Figure 3:
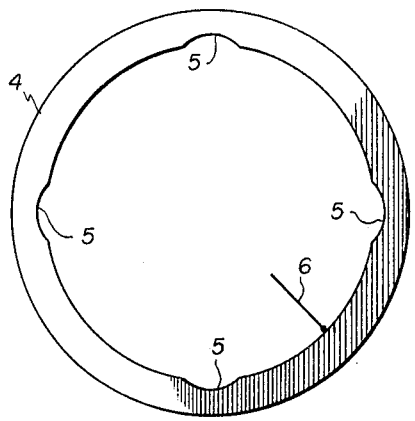
FIGURE 3 illustrates a top view of a ring component of the invention.
Figure 4:
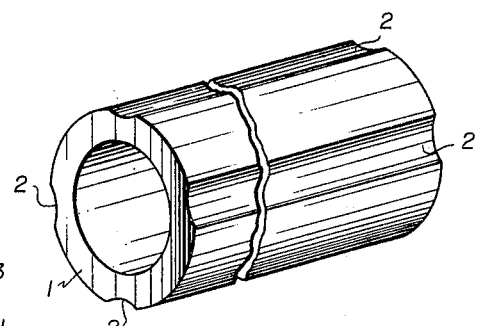
FIGURE 4 illustrates an isometric view of the core component of the invention.
Figure 5:
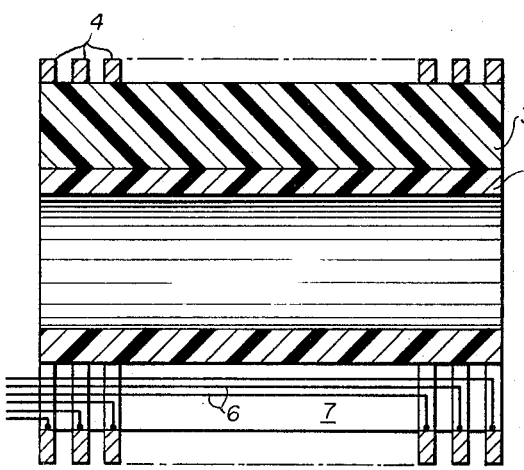
FIGURE 5 illustrates a cross-sectional view along lines 5—5 of FIGURE 1.
Figure 6:
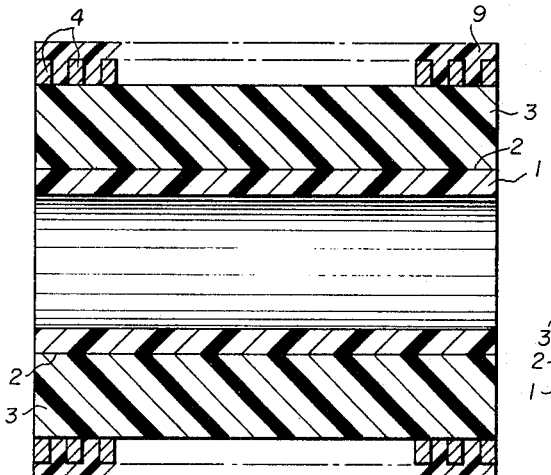
FIGURE 6 illustrates a cross-sectional view corresponding to FIGURE 2 and further provided with molded insulation material.
Figure 7:
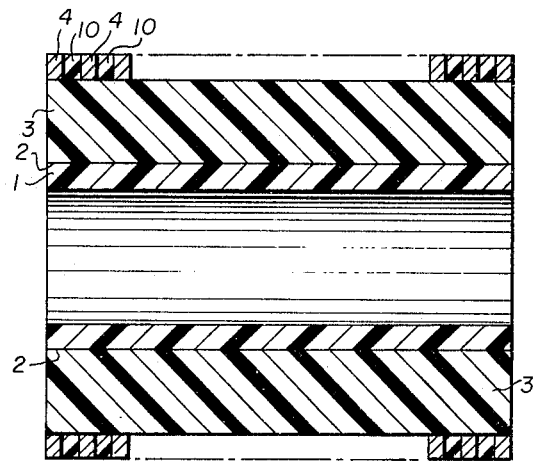
FIGURE 7 illustrates a cross-sectional view corresponding to FIGURE 6 with excess molded insulation material removed.
Figure 8:
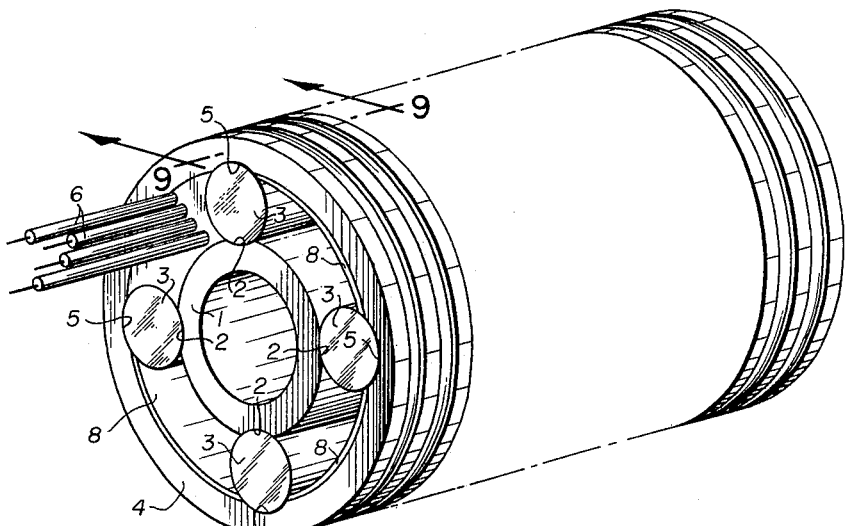
FIGURE 8 illustrates an isometric view of a completed slip ring assembly.
Figure 9:
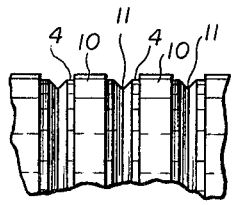
FIGURE 9 illustrates a fragmentary surface view along lines 9—9 of FIGURE 8.

Referring to the figures, the slip ring assembly comprises an elongated cylindrical core 1 of insulation material, such as transite, ceramic, Teflon or other synthetic resin, in the form of a cylindrical tube having a plurality of parallel axially extending grooves 2 on the external surface of the core and being circumferentially spaced from each other. A plurality of elongated rods 3 of insulation material, e.g. Teflon, are positioned longitudinally of the core with the rods each being seated in one of the grooves 2. A plurality or series of conductive rings 4, each having a plurality of notches 5 circumferentially spaced from each other in the inner surface of each ring, are mounted on the rods 3 with the notches frictionally engaging the rods and the rings being spaced from each other axially of the rods and frictionally maintained in such spaced position. An electrical conductor wire 6 is connected, as by welding, to the internal surface of each ring as illustrated by FIGURES 3 and 5. Having assembled the rings 4 on rods 3 as illustrated by FIGURES 2 and 5, there is provided longitudinal axially extending passages 7 between the circumferentially spaced rods 3 and between the core 1 and the series of spaced rings 4. The passages 7, excepting the one passage containing the wire conductors 6, are provided with a masking means 8 adjacent the inner surfaces of the conductor rings as shown by FIGURES 1 and 8. The masking means, as shown, are in the form of elongated curved blades with the curvature being along the width of the blades to conform with the curvature of the inner surfaces of their adjacent metal rings. Otherwise, the masking means may be subsequently removable plugs. Having positioned the masking means in their respective passages, the assembly is further masked at both ends, not illustrated, and the assembly is inserted into a mold of slightly larger diameter than that of the assembly and wherein a resin insulation material is introduced. In the molding process, the resin insulation material, e.g. Teflon, is caused to flow into the spaces between the rings 4 into contact with the masking means and to fill the unmasked passage containing the conducting wires and thereby embedding the wires as illustrated by FIGURE 8. Also, at this stage, excess insulation material 8, as illustrated by FIGURE 6, is formed as a covering over the conductive rings 4. Subsequently, as illustrated by FIGURE 7, the molded excess insulation material 9 is removed, e.g. by machining, to expose the metal rings 4 and to provide a series of in situ molded insulation rings 10 alternating with the metal rings axially of the assembly. Thereafter, as illustrated by FIGURES 8 and 9, the metal rings 4 are each peripherally recessed relative to their adjacent insulation rings 10 and a peripheral groove 11 is formed in the recessed surface of each metal ring 4.

Various modifications of the invention are contemplated within the scope of the appended claims.

What is claimed is:
1. A slip ring assembly comprising an elongated cylindrical core, an elongated cylindrical sleeve coaxially spaced from and substantially co-extensively encompassing the core, plurality of parallel circumferentially spaced elongated rods positioned between the core and sleeve substantially co-extensive with the core and sleeve, the sleeve being composed of a series of electrically conductive metal rings bonded to a series of in situ molded adjacent insulation rings, the metal rings and insulation rings axially alternating with each other and forming the sleeve, and a plurality of electrical conductor wires located longitudinally between the core and sleeve with each wire connected to one of said metal rings and extending outwardly of an end of the core and sleeve assembly.

2. A slip ring assembly according to claim 1, wherein the metal rings are peripherally recessed relative to their adjacent insulation rings.

3. A slip ring assembly according to claim 2, wherein the recessed metal rings are each provided with an annular peripheral groove.

4. A slip ring assembly according to claim 1, wherein the core and rods are composed of insulation material.

5. A slip ring assembly according to claim 1, wherein the core is provided with circumferentially spaced parallel axially extending grooves on its external surface, each rod being seated in one of the grooves, the series of metal rings having a plurality of notches circumferentially spaced from each other on the inner surface of each ring, and the metal rings being mounted on the rods with their notches engaging the rod.

References Cited
UNITED STATES PATENTS 3,375,479  3/1968  Lowe _____ 339—8 X

FOREIGN PATENTS 831,646  3/1960  Great Britain.
872,503  7/1961  Great Britain.

RICHARD E. MOORE, Primary Examiner